United States Patent Office 2,779,808
Patented Jan. 29, 1957

2,779,808

OXIDATION OF ALDEHYDES

Arthur C. Whitaker, Fox Chapel, Pa., assignor to Gulf Research & Development Company, Pittsburgh, Pa., a corporation of Delaware No Drawing. Application March 31, 1954,
Serial No. 420,181

7 Claims. (Cl. 260—676)

This invention relates to a process for preparing hydrocarbons from aldehydes and particularly a process for preparing hydrocarbons from branched aldehydes having at least one alkyl group in the alpha position.

Briefly, the reaction of an aldehyde to form a hydrocarbon in accordance with my invention comprises subjecting an aldehyde to the action of a gas containing molecular oxygen in the presence of an oxidation catalyst and an alkyl mercaptan and at a moderate temperature to convert the aldehyde to a hydrocarbon having one less carbon atom than the aldehyde.

The reaction of an aldehyde to form a hydrocarbon in accordance with my invention is not a thermal reaction, because no thermal decomposition of the aldehyde will occur at the moderate temperatures employed herein. Moreover, I have found that if the process is carried out in the absence of oxygen, the aldehyde undergoes no change. In using molecular oxygen in the reaction, however, I am able to initiate a free radical chain reaction which may be terminated either by the formation of the corresponding acid or a normal hydrocarbon containing one less carbon atom than the starting material. By conducting the process in accordance with my invention, I am able to obtain a relatively high yield of hydrocarbon and minimize the formation of acids.

As charge stock for the reaction, any aldehyde, even those of very high molecular weight, can be used. Best results, however, are obtained when the starting aldehyde is a branched aldehyde having at least one alkyl group in the alpha position and containing a total of at least 6 carbon atoms, preferably about 8 to about 16 carbon atoms, in the molecule.

The reaction takes place easily with high yields of hydrocarbons at a relatively low temperature. While I prefer, for best results, to employ a temperature in the range of about 65° to about 85° C., I can use a temperature as low as about 20° C. or as high as about 200° C. Care, however, must be exercised in the selection of temperature for any particular reaction. Thus, at low temperatures, such as room temperature, rates of reaction will be slow, and at high temperatures, although rates of reaction would increase, side reactions leading to degradation products might occur. The reaction can be carried out at any suitable pressure, and while the rate of the reaction may be speeded up by increasing the pressure, the effect upon the yields will be very slight. In general, I can conduct the reaction at a pressure of about 15 to about 150, preferably about 15 to about 30, pounds per square inch absolute.

Although the rate of feed of gas containing molecular oxygen has little or no effect on the yields of hydrocarbons, higher rates of addition of oxygen to the reaction mixture will have a tendency to bring about higher reaction rates. An upper limit is determined by the fact that excessive feed rates reduce the partial pressure of the reactants to the extent that they can be swept from the reactor. Generally, I can employ the gas containing molecular oxygen, based upon the molecular oxygen, at a rate of about 0.03 to about 0.50, preferably about 0.1 to about 0.3, cubic feet of molecular oxygen per mol of aldehyde per hour. The rate of the reaction will be determined to a large extent by the starting aldehyde employed, the pressure and temperature utilized, and the rate of feed of oxygen, but in general a period of about one-half to about 10, preferably about one to about 4, hours is sufficient to obtain the desired results.

While the reaction of the aldehyde to form a hydrocarbon can take place in the absence of catalysts, provided molecular oxygen is employed in the reaction, I have found in accordance with my invention that increased yields of hydrocarbons are obtained when the reaction takes place in the presence of oxidation catalysts, particularly oil soluble organic salts of the transition elements and their corresponding organic oxides, and mercaptans, particularly an alkyl mercaptan. As examples of oxidation catalysts, oil soluble organic salts whose cation component can be cobalt, nickel, iron, chromium, iridium, rhodium, copper, silver, manganese and vanadium and whose anion component can be represented by $RCO_2$— wherein R is an open chain aliphatic radical having about 7 to about 17 carbon atoms or a cycloaliphatic radical can be employed as well as the corresponding oxides. Oxidation catalysts which have been found to be particularly suitable for the reaction are the cobalt salt of 2-ethylhexanoic acid and manganese naphthenate. Mercaptans which are particularly suitable include those alkyl mercaptans wherein the alkyl group has about 4 to about 12 carbon atoms, preferably about 6 to about 10 carbon atoms. In general, I can use about 0.1 to about 5, preferably one-half to 2, grams of alkyl mercaptan per gram mol of aldehyde.

The concentration of the catalyst needed for the reaction is small, and, in fact, traces of catalyst would be sufficient in view of the fact that the reaction is believed to be a chain-type reaction. Thus, runs made with 0.06 grams of the cobalt salt of 2-ethylhexanoic acid per mol of 2-ethylhexaldehyde, and with 0.006 grams of the same salt per mol of the aldehyde, under otherwise equivalent conditions, gave products essentially the same in yield and composition. In general, I can use about 0.003 to about 0.5, preferably about 0.006 to about 0.1, grams of oxidation catalyst per gram mol of aldehyde.

The invention will be understood more fully by reference to the following specific examples.

Example

One mol (128 grams) of 2-ethylhexaldehyde, 1 gram of the cobalt salt of 2-ethylhexanoic acid and 1 gram of tertiary-octyl mercaptan were placed in a glass reactor, of relatively high length-to-diameter ratio, and equipped with a fritted disc disperser and outlet. The reactor was placed in a thermostatted oil bath at 85° C. and air was passed through the liquid at a rate of 0.01 cubic feet per minute for a period of 2 hours. The product was distilled and the data showed that conversion of the aldehyde was 70.6 mol percent, giving 0.495 mols of n-heptane and 0.161 mols of 2-ethylhexanoic acid. These figures represent an efficiency of 70 percent for n-heptane and about 22 percent for the acid. The remainder is attributed to residue and a small yield of 3-heptanol.

In the following table are summarized various runs, including that of the foregoing example, using n-heptaldehyde as well as 2-ethylhexaldehyde as the aldehyde charge stock. The reactions were conducted without an oxidation catalyst or an alkyl mercaptan, with an oxidation catalyst only and with both the oxidation catalyst and an alkyl mercaptan. The acids produced in using 2-ethylhexaldehyde and n-heptaldehyde are 2- ethylhexanoic acid and heptanoic acid, respectively. The air feed rate was 0.6 cubic feet per hour and the duration was two hours for all of the runs.

TABLE

| Aldehyde (1 mol) | Temp. (° C.) | Catalyst (grams) | Other Compounds Present (grams) | Total Conversion (percent) | Yield Hydrocarbon (mol percent) | Yield Acid (mol percent) |
|---|---|---|---|---|---|---|
| 2-Ethylhexaldehyde | 85 | Cobalt salt of 2-ethylhexanoic acid (1 gram). | t-Octyl mercaptan (1 gram). | 70.6 | 49.5 | 16.1 |
| n-Heptaldehyde | 85 | ___do___ | ___do___ | 52.9 | 16.4 | 36.5 |
| 2-Ethylhexaldehyde | 85 | ___do___ | None | 56.2 | 30.0 | 19.4 |
| n-Heptaldehyde | 85 | ___do___ | ___do___ | 54.3 | 9.8 | 44.5 |
| Same | 65 | ___do___ | ___do___ | 49.1 | 6.3 | 42.8 |
| 2-Ethylhexaldehyde | 85 | None | ___do___ | 29.1 | 9.7 | 16.2 |

The table graphically illustrates the advantages of my invention. While the total conversion of both the branched aldehyde having at least one alkyl in the alpha position, 2-ethylhexaldehyde, and the normal aldehyde, n-heptaldehyde, is high, it will be noted that highest yields of hydrocarbons are obtained in general when the branched aldehyde is employed as the starting material. In fact, when n-heptaldehyde is used as the starting material, the yield of acids is higher than of the hydrocarbon. This holds true whether or not an oxidation catalyst or alkyl mercaptan is employed in the reaction. That the presence of an oxidation catalyst is essential for high yields of hydrocarbon, even when using a branched aldehyde as a starting material, is evident from the table. Thus, when 2-ethylhexaldehyde is used in the reaction and no catalyst or other additive is present, a total conversion of only 29.1 percent is obtained and the amount of acid produced is greater than the amount of the hydrocarbon. When this reaction is conducted in the presence of a small amount of the cobalt salt of 2-ethylhexanoic acid, the total conversion of the aldehyde is 56.2 percent and the yield of hydrocarbon is 30.0 percent and substantially greater than the acid. The addition to the reaction of a small amount of an alkyl mercaptan, however, increases the total conversion of aldehyde to 70.6 and the yield of hydrocarbon to 49.5 percent, more than 3 times the amount of acid.

Obviously, many modifications and variations of the invention, as hereinabove set forth, may be made without departing from the spirit and scope thereof, and therefore only such limitations should be imposed as are indicated in the appended claims.

I claim:

1. A process of converting an aldehyde to a product comprising a saturated aliphatic hydrocarbon having one less carbon atom than the aldehyde which comprises subjecting a saturated aliphatic aldehyde to the action of a gas containing molecular oxygen in the presence of an oxidation catalyst and a mercaptan at a temperature of about 20° to about 200° C.

2. A process of converting an aldehyde to a product comprising a saturated aliphatic hydrocarbon having one less carbon atom than the aldehyde which comprises subjecting a branched saturated aliphatic aldehyde having at least one alkyl group in the alpha position and containing a total of at least 6 carbon atoms to the action of a gas containing molecular oxygen in the presence of an oxidation catalyst and an alkyl mercaptan at a temperature of about 20° to about 200° C.

3. A process of converting an aldehyde to a product comprising a saturated aliphatic hydrocarbon having one less carbon atom than the aldehyde which comprises passing a gas containing molecular oxygen at a rate corresponding to about 0.03 to about 0.5 cubic feet of oxygen per mol of aldehyde per hour, through a composition comprising a branched saturated aliphatic aldehyde having at least one alkyl group in the alpha position and containing at least 6 carbon atoms in the presence of an oxidation catalyst and an alkyl mercaptan at a temperature of about 20° to about 200° C.

4. A process of converting an aldehyde to a product comprising a hydrocarbon having one less carbon atom than the aldehyde which comprises passing a gas containing molecular oxygen at a rate corresponding to about 0.03 to about 0.5 cubic feet of oxygen per mol of aldehyde per hour, through a composition comprising 2-ethylhexaldehyde in the presence of an oxidation catalyst and an alkyl mercaptan at a temperature of about 20° to about 200° C.

5. A process of converting an aldehyde to a product comprising a hydrocarbon having one less carbon atom than the aldehyde which comprises passing a gas containing molecular oxygen at a rate corresponding to about 0.03 to about 0.5 cubic feet of oxygen per mol of aldehyde per hour, through a composition comprising 2-ethylhexaldehyde in the presence of the cobalt salt of 2-ethylhexanoic acid and a mercaptan at a temperature of about 65° to about 85° C. for a period of about one to about 4 hours.

6. A process of converting an aldehyde to a product comprising a hydrocarbon having one less carbon atom than the aldehyde which comprises passing a gas containing molecular oxygen at a rate corresponding to about 0.03 to about 0.5 cubic feet of oxygen per mol of aldehyde per hour, through a composition comprising 2-ethylhexaldehyde in the presence of the cobalt salt of 2-ethylhexanoic acid and t-octyl mercaptan at a temperature of about 65° to about 85° C. for a period of about one to about 4 hours.

7. A process for converting an aldehyde to a product comprising a branched saturated aliphatic hydrocarbon having one less carbon atom than the aldehyde which comprises subjecting a branched saturated aliphatic aldehyde having at least one alkyl group in the alpha position and containing a total of at least 6 carbon atoms to the action of a gas containing molecular oxygen in the presence of an oxidation catalyst and an alkyl mercaptan having about 4 to about 12 carbon atoms, the amount of said alkyl mercaptan being about 0.1 to about 5 grams per gram mol of said aldehyde, at a temperature of about 20° to 200° C.

References Cited in the file of this patent

UNITED STATES PATENTS

| 2,047,534 | Walker et al. | July 14, 1936 |
| 2,051,807 | Allen | Aug. 25, 1936 |
| 2,052,268 | Adams et al. | Aug. 25, 1936 |
| 2,060,267 | Toussaint | Nov. 10, 1936 |
| 2,444,399 | Duval et al. | June 29, 1948 |